Figure 1:
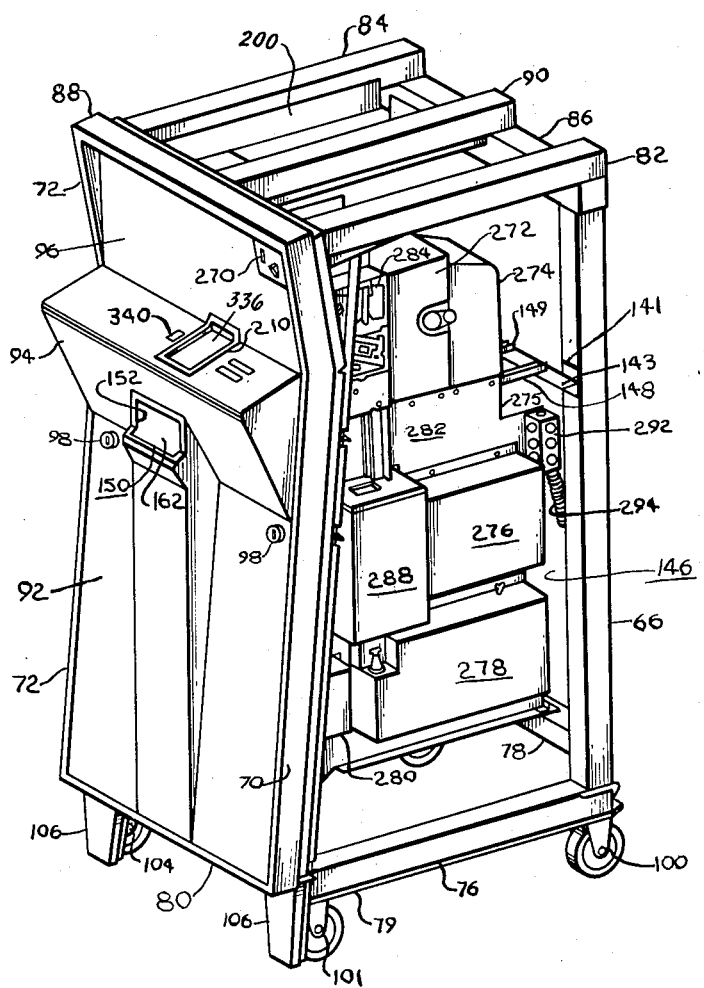

INVENTOR.
CLIFFORD B. ADAMS
BY
Rey Eilers
ATT'Y.

May 12, 1964 C. B. ADAMS 3,132,654
MONEY-HANDLING DEVICES
Filed April 3, 1961 7 Sheets-Sheet 2
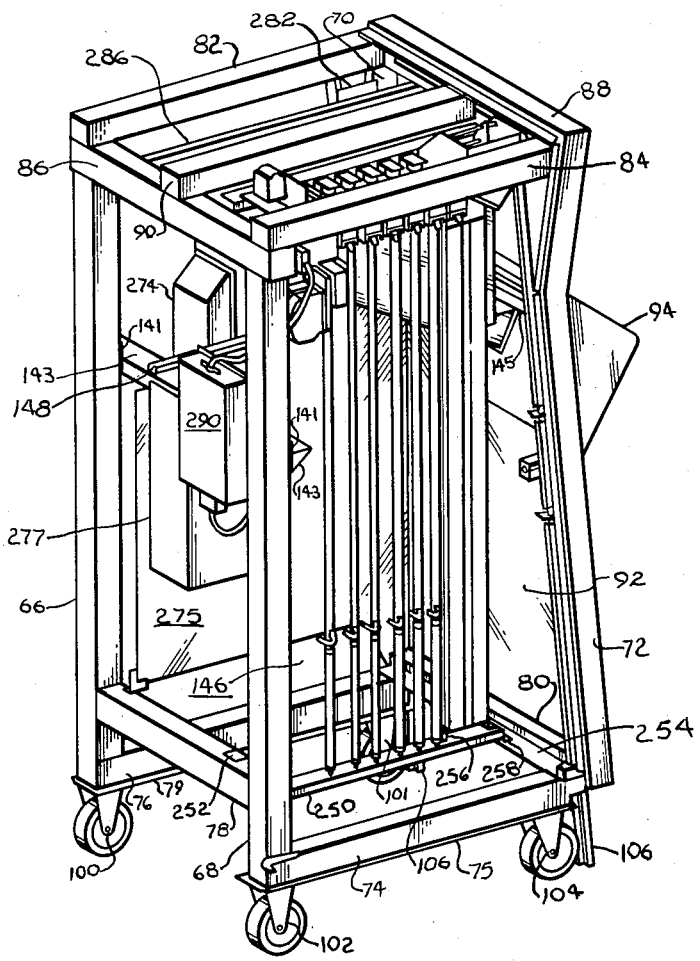
FIG_2
INVENTOR.
CLIFFORD B. ADAMS
BY
Rey Eilers
ATT'Y.

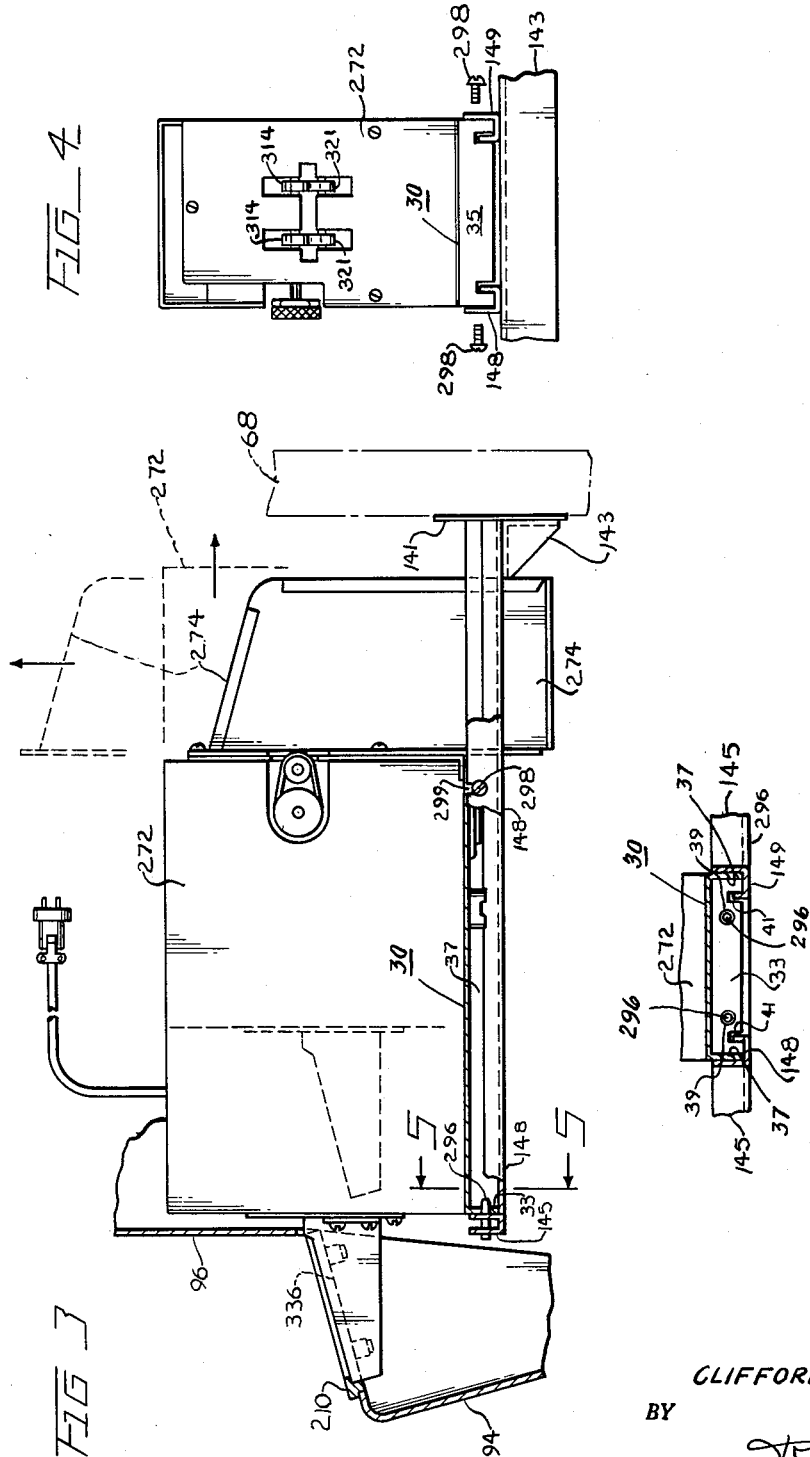

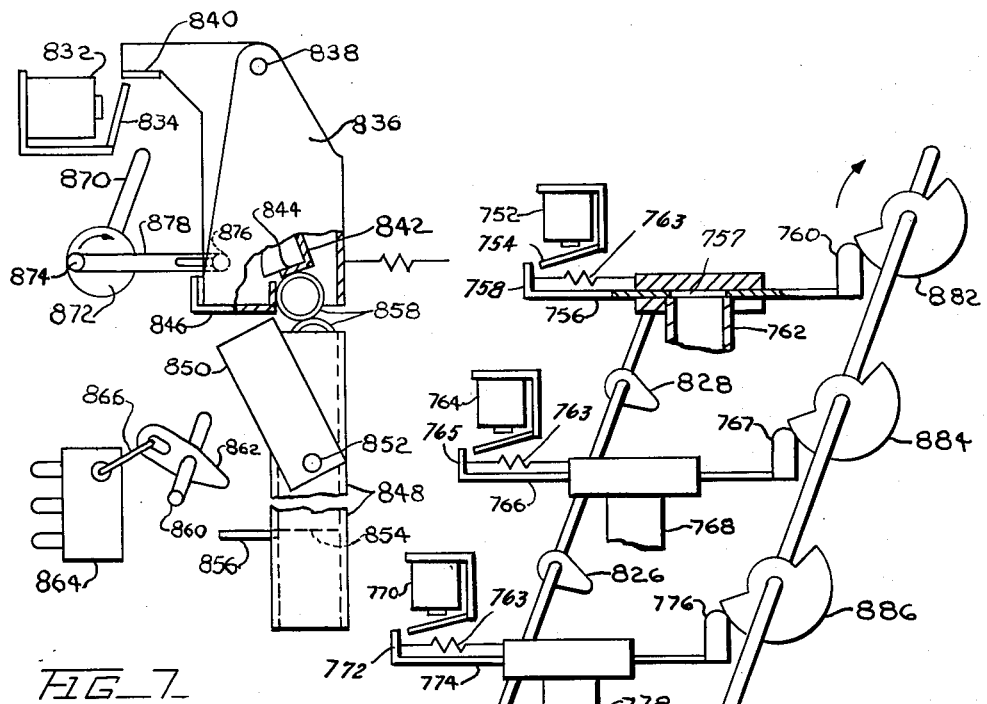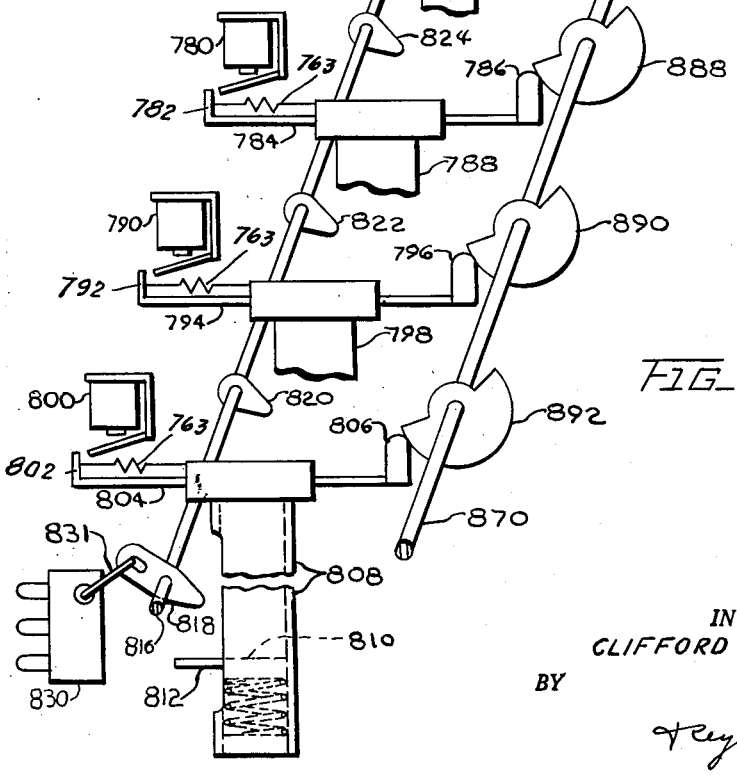

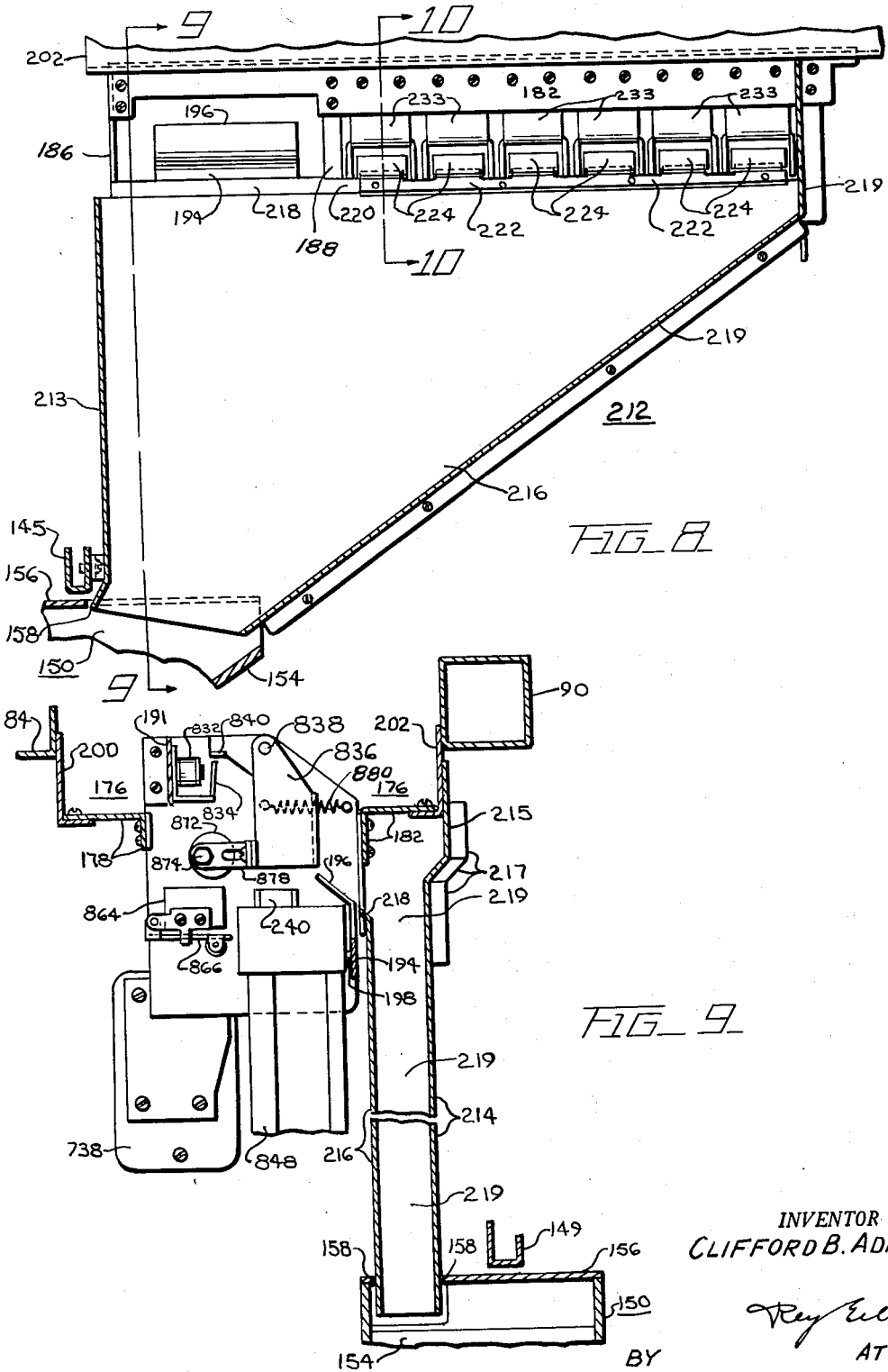

May 12, 1964
C. B. ADAMS
3,132,654
MONEY-HANDLING DEVICES
Filed April 3, 1961
7 Sheets-Sheet 6
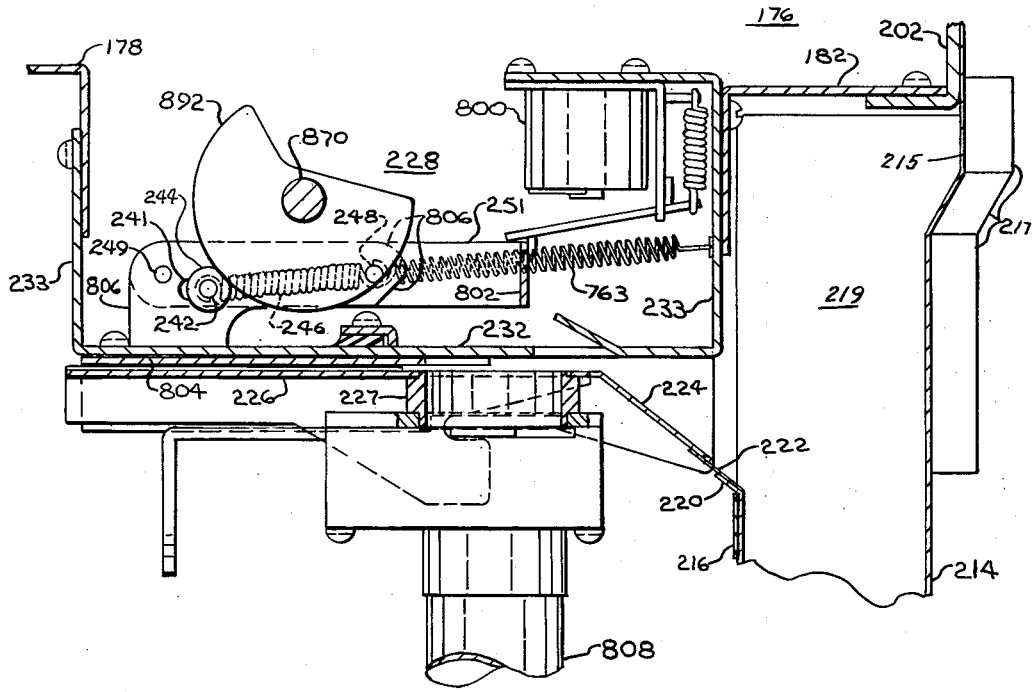
FIG_10
INVENTOR
CLIFFORD B. ADAMS
BY
ATT'Y.

May 12, 1964 C. B. ADAMS 3,132,654
MONEY-HANDLING DEVICES
Filed April 3, 1961 7 Sheets-Sheet 7
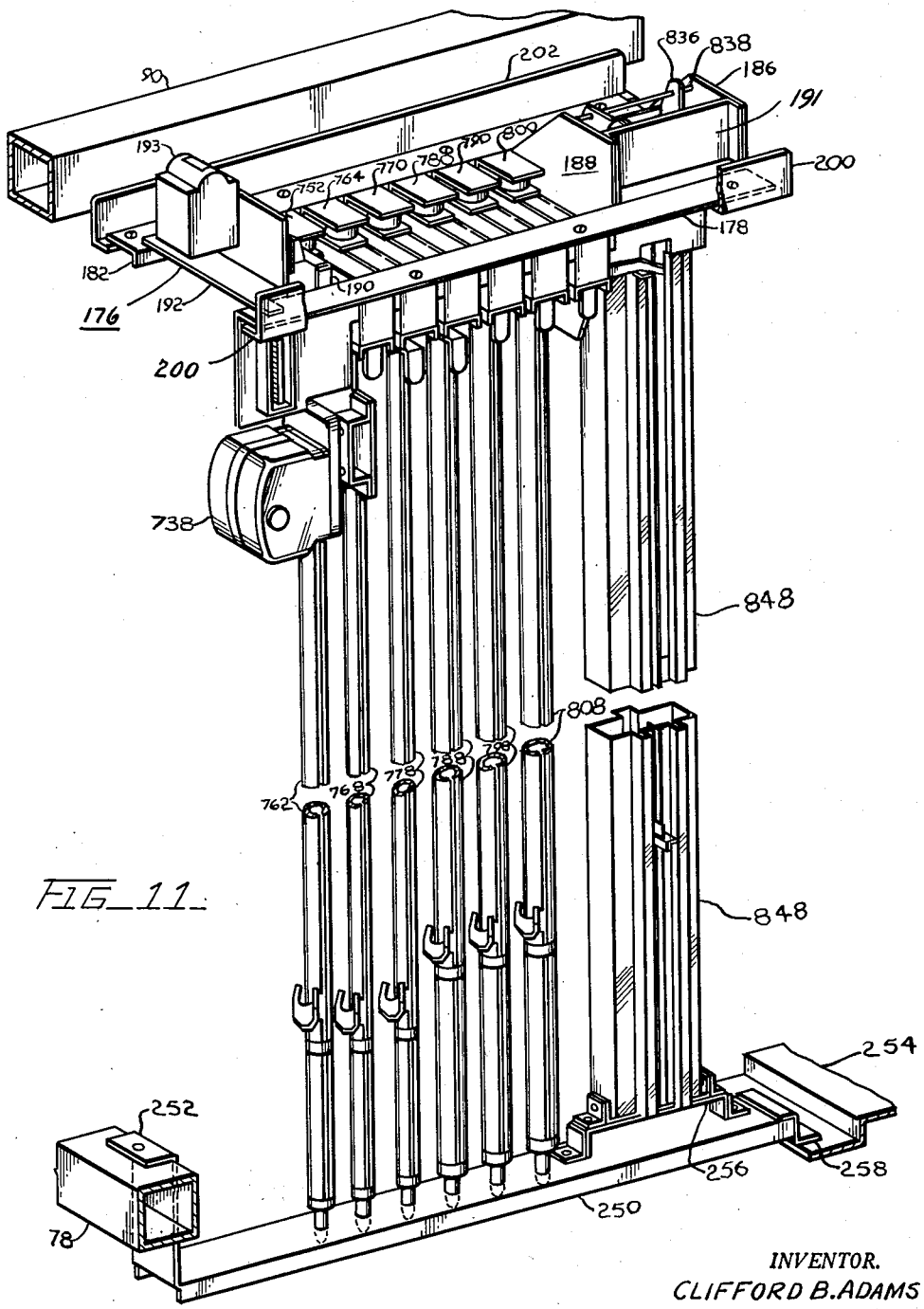
FIG_11
INVENTOR.
CLIFFORD B. ADAMS
BY
ATT'Y.

United States Patent Office 3,132,654
Patented May 12, 1964

3,132,654
MONEY-HANDLING DEVICES
Clifford B. Adams, Bellefontaine Neighbors, Mo., assignor to National Rejectors, Inc., St. Louis, Mo., a corporation of Missouri
Filed Apr. 3, 1961, Ser. No. 100,271
10 Claims. (Cl. 133—1)

This invention relates to improvements in money-handling devices. More particularly, this invention relates to improvements in supporting frames for change-making devices.

It is, therefore, an object of the present invention to provide an improved supporting frame for a change-making device.

Change-making devices have been developed and are being marketed which can accept currency and pay out change and which can also accept coins and pay out change. It would be desirable to provide such change-making devices with frames that would make it possible to bodily remove the currency-identifying units of those change-making devices for checking and replacing. With such frames, the change-making devices could easily be maintained in optimum operating condition. Furthermore, with such frames, the currency-identifying units could be bodily replaced by substitute currency-identifying units; and the delays and inefficiencies involved in field repairing could be obviated. The present invention provides a frame for a change-making device, that accepts currency and coins and pays out change, and that makes it possible to bodily remove the currency-identifying unit of that change-making device. It is, therefore, an object of the present invention to provide a frame for a change-making device that makes it possible to bodily remove the currency-identifying unit of that change-making device.

The currency-identifying unit of the change-making device provided by the present invention is enclosed within a sealed housing, and that housing is movably mounted on guides. Those guides start at the exterior of the frame for the change-making device and extend inwardly of that frame. Those guides make it possible to mount the currency-identifying unit on those guides at the exterior of the frame, and thus at a point where there is ample light and ample freedom of movement. Thereafter, those guides make it possible to move that currency-identifying unit inwardly to a precisely-fixed, less accessible position within the interior of that change-making device. Those guides speed up the insertion and removal of the currency-identifying unit, and they also keep that currency-identifying unit from being jarred and injured during its insertion and removal. It is, therefore, an object of the present invention to provide a frame for a change-making device which has guides that start at the exterior of that frame and extend inwardly of that frame and that make it possible to mount the currency-identifying unit of that change-making device at the exterior of that frame and then move that currency-identifying device into a precisely-fixed, less accessible position within the interior of that change-making device.

It would also be desirable to mount the change-ejecting assemblies of the change-making device so they can be bodily removed for ready checking and replacement. Where those assemblies are so mounted, the delays and inefficiencies involved in field repairing can be eliminated. The present invention provides a change-making device wherein the change-ejecting assemblies can be bodily removed for ready checking and replacement; and it is, therefore, an object of the present invention to provide a change-making device wherein the change-ejecting assemblies can be bodily removed as a unit.

The change-ejecting assemblies of the change-making device provided by the present invention are mounted at the top of the frame of that change-making device. Such an arrangement gives full access to those change-ejecting assemblies and makes it very easy to bodily remove those change-ejecting assemblies—the removal of a few screws making it possible to bodily lift the frame for those change-ejecting assemblies out of the frame for the change-making device. It is, therefore, an object of the present invention to mount the change-ejecting assemblies of a change-making device at the top of that device.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

In the drawing, FIG. 1 is a perspective view of one form of change-making device and of the supporting frame therefor, FIG. 2 is a perspective view of the change-making device and frame of FIG. 1 as that device and frame are viewed from the rear, FIG. 3 is a partially broke-away, vertical section through the change-making device of FIGS. 1 and 2 and it shows the housing for the currency-identifying unit plus part of the mounting for that housing, FIG. 4 is a rear view of the housing for the currency-identifying unit of the change-making device of FIGS. 1 and 2, FIG. 5 is a sectional view through part of the mounting shown in FIG. 3, and it is taken along the plane indicated by the line 5—5 in FIG. 3, FIG. 6 is a partially-sectioned, schematic view in perspective of the coin-ejecting assemblies of the change-making device of FIGS. 1 and 2.

FIG. 7 is a partially-sectioned, schematic view in perspective of the currency-ejecting assembly of the change-making device of FIGS. 1 and 2, FIG. 8 is a sectional view through the chute of the change-making device of FIGS. 1 and 2, FIG. 9 is a sectional view through the chute of FIG. 8, and it is taken along the plane indicated by the line 9—9 in FIG. 8, FIG. 10 is a further sectional view through the chute of FIG. 8, and it is taken along the plane indicated by the line 10—10 in FIG. 8, and FIG. 11 is a perspective view, on a larger scale, of the change-ejecting apparatus of the change-making device of FIGS. 1 and 2.

Referring to the drawing in detail, the numerals 66, 68, 70 and 72 denote uprights of a frame for a change-making device. The uprights 66 and 68 are straight throughout their lengths, but the uprights 70 and 72 are bent to define obtuse dihedral angles. A spacer 74 is secured to and extends between the lower ends of the uprights 68 and 72, and a spacer 76 is secured to and extends between the lower ends of the uprights 66 and 70. A spacer 78 extends between and is secured to the lower ends of the uprights 66 and 68, and a spacer 80 is secured to and extends between the lower ends of the uprights 70 and 72. Those various spacers fixedly and rigidly hold the lower ends of the uprights 66, 68, 70 and 72 in spaced relation.

A spacer 86 extends between and is secured to the upper ends of the uprights 66 and 68. A spacer 82 extends between and is secured to one end of the spacer 86 and the upper end of the upright 70; and a spacer 84 extends between and is secured to the other end of the spacer 86 and the upper end of the upright 72. A spacer 88 is secured to and extends between the spacers 82 and 84 and is secured to and extends between the upper ends of the uprights 70 and 72. A spacer 90 extends between the spacer 86 and the spacer 88. The spacers 82, 84, 86, 88 and 90 rigidly and fixedly hold the upper ends of the uprights 66, 68, 70 and 72 in spaced relation. The various uprights and spacers coact to form a sturdy and rugged frame which can support a change-making device.

Shallow recesses are formed in the lower portions of the front faces of the uprights 70 and 72, and those recesses accommodate a panel 92 of decorative nature and a protruberance 94 of generally triangular cross-section. A shallow recess is formed in the front face of the spacer 80, and that recess accommodates the lower edge of the panel 92. A deep recess is provided in the front face of the spacer 88, and recesses of progressive depth are provided in the front faces of the upper portions of the uprights 70 and 72, to accommodate an ornamental panel 96; and that panel is set at a slight angle to the plane defined by the upper portions of the uprights 72 and 70. The uprights 70 and 72, the spacers 80 and 88, panels 92 and 96, and the protuberance 94 are intended to constitute an ornamental and attractive removable front for the housing in which the change-making device is normally disposed. The uprights 70 and 72 and the spacers 80 and 88 will preferably have the outer faces thereof overlain by thin sheets of an ornamental metal such as stainless steel.

Casters 100, 101, 102 and 104 are secured to and depend downwardly from plates 75 and 79 which are, respectively, secured to the spacers 74 and 76. Those casters are fixedly secured to those plates and cannot be rotated relative to those plates. Wheels are rotatably supported by those casters, and those wheels are preferably equipped with rubber faces.

The ornamental panel 92 has openings therein adjacent the upper edge thereof, and those openings are normally closed by locks 98. Authorized personnel will have keys that fit those locks; and hence such personnel can remove those locks and attain access to those openings. A wrench can be telescoped through those openings to actuate a locking arrangement which is shown and described in application Serial No. 100,297 by William J. McCalley for Money-Handling Devices which was filed April 3, 1961, now Patent No. 3,101,981; and that locking arrangement can releasably secure the frame of the change-making device within the housing for that device. Cover plates 106 extend downwardly from the spacer 80 and overlie and substantially conceal the wheels which are carried by the casters 101 and 104.

The numeral 143 denotes an angle which is secured to plates 141 at the front faces of the uprights 66 and 68, as shown particularly by FIGS. 1 and 2. The numeral 145 denotes a channel which is secured to the uprights 70 and 72, as indicated by FIG. 2. The angle 143 and the channel 145 are set at approximately the same level, and channels 148 and 149 are fixedly secured to that angle and to that channel. As a result, the channels 148 and 149 are substantially parallel to, but are disposed below the levels of, the spacers 82 and 84. As indicated particularly by FIGS. 4 and 5, the channels 148 and 149 are J-shaped in cross-section.

The numeral 146 generally denotes a change-making device which is supported by the frame which includes the various uprights and spacers; and that change-making device includes a currency-identifying unit which is enclosed within a sealed housing 272. A two-section, bill-receiving cash box is disposed immediately adjacent the outlet end of the housing 272, and the upper section of that cash box is denoted by the numeral 274. The lower section of that bill-receiving cash box is denoted by the numeral 277.

A supporting plate 275 extends downwardly from the housings 272 and 274, and a housing 276 is secured to that plate; and that housing encloses a number of relays. A housing 278 also is secured to the plate 275, and that housing encloses the amplifier for the currency-identifying unit. A housing 280 is secured to the plate 275 at a point which is disposed forwardly of the housing 278, and that housing accommodates the pre-amplifier for the currency-identifying unit. The upper edge of the plate 275 is secured to and supported by the channel 148, and the lower edge of that plate is secured to the spacer 78 and to a formed member 254 which is secured to the spacer 80. Preferably, the plate 275 is made of a number of smaller plates which are suitably fastened together.

The numeral 282 denotes a channel assembly which has the upper end thereof secured to a channel 286 which is secured to and extends between the spacers 86 and 88; and that channel assembly has its lower end secured to the plate 275. That channel assembly holds a slug rejector 284, and also holds the switches which are associated with that slug rejector. The numeral 288 denotes a cash box which is disposed below the channel assembly 280 and which will accommodate quarters and fifty cent pieces which have passed through the slug rejector 284 and which have passed by the switches that are associated with that slug rejector. That cash box is readily removable from the plate 275 to facilitate ready emptying of that cash box.

The numeral 290 discloses a housing for a time delay relay which is part of the change-making device 146. The numeral 292 denotes an electrical connector box from which a cable 294 extends. That cable will be suitably connected to a source of power and will also be connected to the various electrical components of the change-making device 146.

The currency-identifying unit has a base 30 which has the form of a flat plate with downwardly-depending flanges at the front, at the rear, and at the sides thereof. The flange at the front of the base 30 is denoted by the numeral 33, the flange at the rear of that base is denoted by the numeral 35, and the flanges at the sides of that base are denoted by the numeral 37. Two openings 39 are provided in the flange 33, and those openings are adjacent the opposite ends of that flange. Notches 41 are formed in the flange 33, those notches are disposed inwardly of the openings 39, and those notches extend upwardly from the lower edge of that flange but terminate short of the upper edge of that flange. Similar notches 41 are formed in the flange 35 of the base 30, and those notches are in register with the notches 41 in the flange 33.

The notches 41 of the flanges 33 and 35 are in register with the short flanges of the J-shaped channels 148 and 149. The notches 41 are wider than those short flanges are thick, and consequently those notches permit the base 30 to be slid along the channels 148 and 149. Guiding and alining pins 296 are supported by the channel 145, and those pins are held in register with the openings 39 in the flange 33 of the base 30. The openings 39 are dimensioned to telescope snugly over the pins 296, and hence the engagement between those openings and those pins will hold the front end of the currency-identification housing 272 squarely in its intended position. Once the openings 39 have been telescoped over the pins 296, screws 298 can be passed through notches 299 in the long flanges of the J-shaped channels 148 and 149 and seated in threaded openings in the flanges 37 on the sides of the base 30. The positioning of those screws in those notches will lock the housing 272 of the currency-identifying unit against movement relative to the frame of the change-making device.

When the housing 272 of the currency-identifying unit is in its forwardmost position, the platform 336 of that currency-identifying unit will be in register with the rim 210 that is secured to the upper face of the generally-triangular protuberance 94. That rim will project upwardly a short distance above the surface of the upper face of the generally-triangular protuberance 94 and will help patrons guide their bills down onto the surface of the platform 336. A push button 340 will be disposed adjacent the rim 210, and that push button will extend upwardly through an opening in the upper face of the generally-triangular protuberance 94.

The numeral 250 denotes a channel which has one end thereof formed to define a hanger 252; and that hanger extends upwardly over the spacer 78 and is suitably secured to that spacer. The other end of the channel 250 engages the formed member 254 which is suitably secured to the spaced 80; and a bracket 258 is secured to the formed member 254 to help secure the channel 250 to that formed member. A generally U-shaped bracket 256 is secured to the web of the channel 250, and that bracket extends upwardly from that web.

The numeral 150 generally denotes a cup-like receptacle which has the front thereof extending through the panel 92. An opening 152 is provided in the front of that cup-like receptacle, and that opening is normally closed by a closure 162, all as shown and described in application Serial No. 100,342 to Philip A. Johnson for Money-Handling Devices which was filed April 23, 1961. The upper part of the cup-like receptacle is overlain by a closure 156, and an opening 158 is provided in that closure to enable change to enter that cup-like receptacle. That opening overlies a forwardly and downwardly extending portion 154 of the bottom of the cup-like receptacle 150.

The numeral 200 denotes an angle which is secured to the inner face of the spacer 84, as shown particularly by FIG. 9. An angle 202 is secured to that face of the spacer 90 which confronts the inner face of the spacer 84. Those angles depend downwardly from those spacers, and the horizontal portions of those angles are directed toward each other.

The numeral 176 generally denotes a frame which includes an angle 178, an angle 182, a plate 186, a plate 188, a plate 190, and an angle 192. The plate 186 extends between and is secured to the angles 178 and 182, and it fixedly secures the right-hand ends of those angles together, as those angles are viewed in FIG. 11. The plate 188, which is generally similar to the plate 186, also extends between and is secured to the angles 178 and 182. As indicated particularly by FIG. 11, those plates are spaced apart a distance approximately equal to one quarter of the length of the angle 178. The plate 190 also is secured to the angles 178 and 182, and that plate is close to the opposite ends of those angles. The angle 192 is secured to the angles 178 and 182 at a point intermediate the plate 190 and the said other ends of the angles 178 and 180. The angles 178, 182 and 192, and the plates 186, 188 and 190 are rigidly secured together to constitute the frame 176.

The horizontal arm of the angle 178 rests upon the horizontal portion of the angle 200, and that arm will be releasably secured to that portion by fasteners such as screws. The horizontal arm of the angle 182 rests upon the horizontal portion of the angle 202, and that arm will be releasably secured to that portion by fasteners such as screws. To free the frame 176 from the angles 200 and 202, it is only necessary to remove the fasteners.

A plate 191 is secured to and extends between the plates 186 and 188, and a plate 194 also is secured to and extends between the plates 186 and 188. The plate 194 has an upwardly-extending lip 196 which is disposed at an angle to the rest of that plate 194. As indicated particularly by FIG. 9, the lip 196 inclines upwardly and to the left from the plane of the plate 194, and that lip inclines toward the plate 191. The plate 194 supports a pair of pins 198; and those pins have generally conical faces, not shown, and have annular recesses, not shown, adjacent those faces.

The numeral 212 generally denotes a chute of the change-making device, and that chute has a generally triangular wall 214. The upper portion of the wall 214 is offset, as at 215 in FIG. 9; and a flange 217 projects at a right angle from one end of the offset portion 215 and from the rest of that end of the wall 214. A generally similar flange, not shown projects at a right angle from the other end of the offset portion 215 and from the rest of the other end of the wall 214. The lower end of the wall 214 extends down into the opening 158 in the closure 156 for the cup-like receptacle 150, as shown particularly by FIGS. 8 and 9. A second wall 216, of similar triangular configuration, is provided for the chute 212; and an end wall 213 and an inclined bottom 219 coact to hold the walls 214 and 216 in rigidly spaced relation. The upper end of the inclined bottom is vertical, as indicated by FIG. 8, and it closes the right-hand end of the chute 212.

An upwardly-extending lip 218 is provided on the wall 216, and that lip extends upwardly and to the left from the plane of that wall; as that lip and wall are viewed in FIG. 9. The lip 218 has a tall portion which is generally in register with the lip 196 on the plate 194, and it has a short portion 220 which extends from that tall portion to the right-hand end of the wall 216. A notched plate 222 is suitably secured to the inner face of the short portion 220; and the portions of that plate which define the notches therein project upwardly beyond the upper edge of the short portion 220.

The portions of the plate 222 which define the notches in that plate extend upwardly to underlie and abut the forwardly and downwardly inclined front edges 224 of the bottom plates 226 of the coin-ejecting assemblies 228 which are parts of the change-making device. Each of those coin-ejecting assemblies has a horizontally-disposed supporting plate 232; and each of those supporting plates has two elongated slots therein and has upwardly-extending ears 233 at the opposite ends thereof. The ears 233 which overlie the forwardly and downwardly inclined edges 224 are secured to the angle 182 of the frame 176; and those ears will be bent to extend horizontally to the left, as shown by FIG. 10. The horizontal portions of those ears will support the electromagnets 752, 764, 770, 780, 790 and 800 shown in FIG. 6. The upwardly-extending ears 233 at the other ends of the supporting plates 232 are secured to the angle 178. As indicated particularly by FIG. 10, the supporting plates 232 and the bottom plates 226 confine between them the coin-ejecting slides 756, 766, 774, 784, 794 and 804 shown in FIG. 6. Each of those slides has two ears which extend upwardly through the elongated slots in the adjacent supporting plates 232, and those ears then extend horizontally above and parallel to those supporting plates. Those ears have slots 241 which accommodate pivots 242; and rollers 244 are rotatably mounted on those pivots. Helical extension springs 246 extend between pins 248 and the pivots 242 to urge those pivots toward the right-hand ends of those slots. The pins 248 coact with fasteners 249 to secure the arms of U-shaped brackets 251 to the said ears of the various slides. The closed ends of those U-shaped brackets are adjacent the free ends of the armatures of the electromagnets 752, 764, 770, 780, 790 and 800 in FIG. 6. As indicated by FIG. 10, those free ends have downwardly-directed ears that normally lie in the paths of the closed ends of the U-shaped brackets 251. Springs 763 extend between the pins 248 and the ears 233; and those springs bias the slides toward coin-ejecting position. The bottom plates 226 have rings 227 secured to them, and those rings can have the coin storage tubes 762, 768, 778, 788, 798 and 808 releasably secured to them.

The coin-ejecting slide 804, the spring 763, one of the ears 806, the electromagnet 800, and the armature for that electromagnet are shown in detail in FIG. 10, but that slide, spring, ear, electromagnet and armature are shown only schematically in FIG. 6. Similarly, the other slides, springs, ears, electromagnets and armatures of the coin-ejecting assemblies are shown only schematically in FIG. 6. The closed ends of the U-shaped brackets 251 are, for clarity of showing, shown as ears 758, 765, 772, 782, 792 and 802 in FIG. 6. The cams 882, 884, 886, 888, 890 and 892 actually engage the rollers 244 held by the ears 760, 767, 776, 786, 796 and 806; but, for clarity of showing, those cams are shown, in FIG. 6, as directly engaging those ears. In addition, while the coin-ejecting slides actually have semi-circular recesses at the ends thereof so as to accommodate the coins which are pressed upwardly against the lower faces of the supporting plates 232, those slides have, for clarity of showing, been shown in FIG. 6 as having coin-receiving openings 757 therein.

Further details of the coin-ejecting assemblies are shown and described in Erickson et al. application Serial No. 35,504 for Coin-Separators which was filed on June 13, 1960. In addition, full details of the structure for, and the manner of, releasably securing the coin storage tubes to the rings 227 are shown and described in application.

In the particular change-making device shown and described herein, there are six coin-ejecting assemblies 228. One of those coin-ejecting assemblies has a coin storage tube 762 which accommodates nickels, has an ejector 756 with a coin-receiving opening 757, with an ear 760 at the forward end thereof and with an ear 758 adjacent the rear end thereof, has a spring 763 that normally holds the ear 760 adjacent a cam 882, and has the ear 758 in register with the armature 754 of the electromagnet 752.

Two coin-ejecting assemblies are provided to eject dimes, and those coin-ejecting assemblies have coin storage tubes 768 and 778 and have coin-ejecting slides 766 and 774. The slide 766 has an ear 767 that normally abuts a cam 884, and it has an ear which normally has the armature of an electromagnet 764 in its path. The slide 774 has an ear 776 which normally abuts the cam 886 and the armature of the electromagnet 770 is normally in the path of the ear 772. Springs 763 bias the slides 766 and 774, respectively, toward the cams 884 and 886.

Three coin-ejecting assemblies are provided to eject quarters; and those coin-ejecting assemblies have coin storage tubes 788, 798 and 808 and have coin-ejecting slides 784, 794 and 804. The ears 786, 796 and 806, respectively, on those slides are urged toward the cams 888, 890 and 892 by the springs 763. The armatures of the electromagnets 780, 790 and 800, respectively, normally be in the paths of the ears 782, 792 and 802 of those slides.

A pivot 838 is secured to and extends between the plates 186 and 188; and that pivot rotatably supports a U-shaped member 836. A plate 842 is carried by the U-shaped member 836, and that plate has a rearwardly extending flange 844. A closure 846 is provided for the rear portion of the bottom of the U-shaped member 836, and the front flange of that closure coacts with the flange 844 on the plate 842 and with the closed front end of the U-shaped member 836 to define a space which can accommodate a currency dispensing tube 858. That space is normally in register with a currency storage tube 848; and that currency storage tube has the lower end thereof resting upon the bracket 256 on the channel 250. A closure 850 is provided for the currency storage tube 848, and that closure has the form of an inverted U. The arms of that closure are rotatably secured to the currency storage tube 848 by pivots 852. A currency-supporting platform 854 is disposed within the currency storage tube 848, and it is biased for movement toward the top of that tube by a Negator spring 240 shown in FIG. 9. An ear 856 is provided on the currency-supporting platform 854, and that ear projects outwardly from the currency storage tube 848.

A shaft 870 is mounted adjacent the U-shaped member 836 and adjacent the coin storage tubes 762, 768, 778, 788, 798 and 808, and that shaft carries a crank 872. A slotted connecting rod 878 has one end thereof secured to the crank 872 by a pin 874 and has the other end thereof connected to the U-shaped member 836 by a pin 876. The shaft 870 also carries cams 882, 884, 886, 888, 890 and 892; and those cams are adjacent the ears 760, 767, 776, 786, 796 and 806, respectively, on the coin-ejecting slides 756, 766, 774, 784, 794 and 804. Normally the shaft 870 is in a position where the slotted connecting rod 878 holds the U-shaped member 836 in the position shown by FIG. 7, and normally that shaft holds the cams 882, 884, 886, 888, 890 and 892 in the position shown by FIG. 6. However, that shaft can rotate in the clockwise direction to permit the right-hand end of the slot in the connecting rod 878 to move away from the pin 876 and to permit the high dwells of the cams 882, 884, 886, 888, 890 and 892 to rotate out of engagement, respectively, with the ears 760, 767, 776, 786, 796 and 806.

The numeral 832 denotes an electromagnet which has the armature 834 thereof normally disposed in the path of an ear 840 on the U-shaped member 836. However, that armature will respond to energization of that electromagnet to move out of the path of the ear 840 and thereby permit rotation of the U-shaped member 836 in the counter clockwise direction whenever the shaft 870 rotates.

A shaft 860 is disposed adjacent the currency storage tube 848, and that shaft carries an arm 862 which is in register with the ear 856 on the currency-supporting platform 854. When the tube 848 has a sufficient supply of currency dispensing tubes 858, the ear 856 will be below and out of register with the arm 862; and at such time the actuator 866 of the switch 864 will be in the raised position shown by FIG. 7.

A shaft 816 is disposed adjacent the coin storage tubes 762, 768, 778, 788, 798 and 808; and that shaft carries arms 828, 826, 824, 822, 820 and 818. Each of these arms is in register with the ear 812 on the coin-supporting platform 810 within the adjacent coin storage tube. As long as an adequate supply of coins is in each of the coin storage tubes, the ears 812 of the coin-supporting platforms 810 in those tubes will be below and out of register with the arms 818, 820, 824, 826 and 828; and the actuator 831 of the switch 830 will be in the raised position of FIG. 6. However, when any one of the ears 812 rises upwardly and engages any one of the arms 818, 820, 822, 824, 826 and 828, the shaft 816 will rotate in the counter clockwise direction and will cause the actuator 831 of the switch 830 to move to its lower position.

The various coin-ejecting assemblies 228 and the currency-ejecting assembly will be secured to the frame 176 and will be removable with that frame as a unit. This is desirable and important because it facilitates prompt and immediate replacement of the coin-ejecting assemblies and of the currency-ejecting assembly, and thus avoids any need of field repairing of those assemblies with the inefficiencies and delays associated with such repairing. It will also be noted that the frame 176 with its coin-ejecting and currency-ejecting assemblies is disposed adjacent the upper part of the frame for the change-making device. This also is desirable because it enables that frame and its associated coin-ejecting and currency-ejecting assemblies to be bodily lifted out of that frame. As a result, all that is needed to remove the frame 176 and its coin-ejecting and currency-ejecting assemblies is to remove the screws which normally hold the horizontal arms of the angles 178 and 182 in position, and then bodily lift that frame 176 out of the frame for the change-making device.

Prior to the removal of the frame 176 from the frame for the change-making device, the various coin storage tubes 762, 768, 778, 788, 798 and 808 and the currency storage tube 848 will be separated from the coin-ejecting and currency-ejecting assemblies. However, that separation is easily accomplished, all as disclosed in the said Erickson et al. application. The coin storage tubes 762, 768, 778, 788, 798 and 808 and the currency storage tube 848 normally have their lower ends supported by the channel 250; but those lower ends are readily separable from that channel.

In the operation of the change-making device provided by the present invention, a patron can insert a quarter in the coin inlet 270 in the panel 96 at the front of the change-making device. That quarter will pass through the slug rejector 284 in the channel assembly 280 and then pass to the cash box 288. As that quarter passes from the slug rejector 284 it will strike a switch, not shown, and that switch will cause the motor 738 to rotate its shaft 870 through one revolution, and it will also cause the electromagnets 752, 764 and 770 to become energized. As a result, the slides 756, 766 and 774 will move to coin-ejecting position during that revolution of the shaft 870. The ejected nickel and dimes will fall into the chute 212 and be directed to the cup-like receptacle 150.

If a patron inserts a fifty-cent piece in the coin inlet opening 270 in the panel 96, that coin will pass through the slug rejector 284 and fall into the cash box 288. As that coin leaves the slug rejector 284, it will engage a switch, not shown, which will energize the motor 738 and which will also energize the electromagnets 752, 764, 770 and 780. As a result, when the motor 738 causes its shaft 870 to make one revolution, the slides 756, 766, 774 and 784 will eject a nickel, two dimes and a quarter; and those coins will fall into the coin chute 212 and then move to the cup-like receptacle 150.

If a patron places a one dollar bill on the platform 336 and then presses the push button 340, the currency-identifying unit in the housing 272 will cause that bill to be tested; and if that bill is accepted, the motor 738 will be energized and the electromagnets 752, 764, 770m, 780 790 and 800 will be energized. As a result, during the resulting revolution of the shaft 870, all of the coin-ejecting slides will move to coin-ejecting position and will dispense one nickel, two dimes and three quarters. Those coins will fall into the chute 212 and then pass to the cup-like receptacle 150.

In the event a patron places a five-dollar bill on the platform 336 and presses the push button 340, the currency-identifying unit in the housing 272 will test that bill; and if that bill is accepted, the motor 738, the electromagnet 832, and all of the electromagnets associated with the coin-ejecting assemblies will be energized. Consequently, during the ensuing rotation of the shaft 870, a currency-dispensing tube 858 will be paid out and then subsequently one nickel, two dimes and three quarters will be paid out. The currency dispensing tube 858 will fall downwardly through the chute 212 and then pass into the cup-like receptacle 150. The coins will follow that currency dispensing tube and will help that tube pass to the front of that receptacle by applying propelling forces to that tube.

The bills which are inserted by patrons will be discharged from the currency-identifying unit within the housing 272 by the soft-faced rollers 314 and 321 shown in FIG. 4. Those bills will enter the upper part 274 of the bill-receiving cash box and then fall down into the lower part 277 of that bill-receiving cash box. The lower part 277 of the bill-receiving cash box is readily removable, as by sliding it rearwardly and away from the upper part 274, to facilitate easy emptying of that lower part.

If it becomes necessary to check or replace the currency-identifying unit within the housing 272, the electrical connectors that connect that unit with the rest of the circuit of the change-making device will be disconnected. Thereafter, all that need be done is remove the upper portion 274 of the cash box, remove the screws 298, and then apply a rearwardly-directed pull to the housing 272. Such a pull will enable that housing to slide from the solid-line position in FIG. 3 to the dotted-line position in FIG. 3; and a further rearwardly-directed pull will enable that housing to be slid off of the outer ends of the channels 148 and 149. The notches 41 in the front flange 33 and in the rear flange 35 of the base 30 will coact with the short flanges of the channels 148 and 149 to positively guide the sliding movement of the housing 272. As a result, there is no chance of the currency-identifying unit being injured by the bumping of the housing 272 therefor into any other component of the change-making device. It will be noted that the channels 148 and 149 extend all the way to the exterior of the frame for the change-making device. This is desirable because it enables the housing 272 for the currency-identifying unit to the separated from and to be re-assembled with the channels 148 and 149 where ample light and ample room for access are available.

Once the currency-identifying unit has been removed from the channels 148 and 149, a replacement currency-identifying unit can be set so the notches 41 in the front and rear flanges 33 and 35 of the base 30 thereof are in register with the short flanges of the channels 148 and 149. This registering operation is easily performed because it takes place at the outermost ends of the channels 148 and 149. Once the notches 41 in the front flange 33 have been telescoped over the short flanges of the J-shaped channels 148 and 149, the currency-identifying unit within the housing 272 can be started moving toward the front of the change-making device. As the rear flange 35 of that housing approaches the outer edges of the channels 148 and 149, the notches 41 in that flange will be set in register with the short flanges of those channels. This registering operation also will be performed at a point where full access and full visibility are available. After the notches 41 in the rear flange 35 have been telescoped over the short flanges of the J-shaped channels 148 and 149, the housing 272 will be fully supported by those channels and can be fully and precisely guided by those channels. The housing 272 for the currency-identifying unit will then be moved forwardly until the openings 39 in the front flange 33 telescope over and are confined by the pins 296; and thereupon the fasteners 298 will be passed through the notches 299 and seated in the threaded openings in the side flanges 37 of the base 30. At this time, the currency-identifying unit will be positively and precisely held in a relatively unaccessible position within the change-making device; and that unit will have been moved into that position without striking any other component of that change-making device.

If it becomes desirable to check and replace any of the coin-ejecting assemblies 228 or to check and replace the currency-ejecting assembly, it is only necessary to separate the coin storage and currency storage tubes from those assemblies, remove the fasteners which normally hold the horizontal arms of the angles 178 and 182, and then bodily raise the frame 176 with its associated components out of the frame for the change-making device. Thereupon a substitute frame 176, with its coin-ejecting assemblies 228, its currency-ejecting assembly, its cam shaft 870, its shaft 816, its shaft 860, and its motor 738, can be set in position on the horizontal arms of the angles 200 and 202. In this simple and straightforward way, full and prompt replacement of the coin-ejecting and currency-ejecting assemblies can be effected.

Whereas the drawing and accompanying description have shown and described a preferred embodiment of the present invention it should be apparent to those skilled in the art that various changes may be made in the form of the invention without affecting the scope thereof.

What I claim is:

1. In a change-making device which has a frame, an opening in said frame, a currency-ejecting assembly mounted on said frame, a coin-ejecting assembly mounted on said frame, a receptacle that is mounted on said frame and that receives currency and coins from said currency-ejecting assembly and said coin-ejecting assembly and that holds said currency and coins available for patrons, and a currency-identifying unit, said currency-identifying unit having a currency-receiving platform that normally is in register with and is abutting said opening, the improvement which comprises a pair of channels that are mounted on said frame, a base for said currency-identifying unit which has notches therein that can telescope downwardly over the flanges of said channels to guide and confine said currency-identifying unit for movement relative to said channels, said channels having the outer ends thereof extending to the exterior of said frame to enable said notches to be telescoped downwardly over said flanges at a point where light and freedom of access are available and having the inner ends thereof extending into a relatively inaccessible area that is within said change-making device and that is adjacent said opening and that is where said currency-identifying unit is normally positioned, whereby said currency-identifying unit can be assembled with said channels at a point where light and freedom of access are available and whereby said currency-identifying unit can then be moved along said channels, while being confined and guided by said channels, as said currency-identifying unit is moved into said relatively inaccessible area within said change-making device, an opening in the leading edges of said base, an alining pin on said frame in said relatively inaccessible area within said change-making device that is adjacent said channels and that can extend into said opening in said leading edge of said base to precisely hold said leading edge of said base in position within said relatively inaccessible area within said change-making device, and fasteners that are securable to said currency-identifying unit adjacent the other end of said currency-identifying unit, and thus away from said relatively inaccessible area within said change-making device, to releasably hold said currency-identifying unit against movement relative to said channels.

2. In a change-making device which has a frame, a currency-ejecting assembly mounted on said frame, a coin-ejecting assembly mounted on said frame, a receptacle that is mounted on said frame and that receives currency and coins from said currency-ejecting assembly and said coin-ejecting assembly and that holds said currency and coins available for patrons, and a currency-identifying unit, the improvement which comprises a pair of channels that are mounted on said frame, a base for said currency-identifying unit which has notches therein that can telescope downwardly over the flanges of said channels to guide and confine said currency-identifying unit for movement relative to said channels, said channels having the outer ends thereof extending to the exterior of said frame to enable said notches to be telescoped downwardly over said flanges at a point where light and freedom of access are available and having the inner ends thereof extending into a relatively inaccessible area within said change-making device where said currency-identifying unit is normally positioned, whereby said currency-identifying unit can be assembled with said channels at a point where light and freedom of access are available and whereby said currency-identifying unit can then be moved along said channels while being confined and guided by said channels as said currency-identifying unit is moved into said relatively inaccessible area within said change-making device, an opening in the leading edge of said base, an alining pin on said frame in said relatively inaccessible area within said change-making device that is adjacent said channels and that can extend into said opening in said leading edge of said base to precisely hold said leading edge of said base in position within said relatively inaccessible area within said change-making device, and fasteners that are securable to said currency-identifying unit adjacent the other end of said currency-identifying unit, and thus away from said relatively inaccessible area within said change-making device, to releasably hold said currency-identifying unit against movement relative to said channels.

3. In a change-making device which has a frame, a currency-ejecting assembly mounted on said frame, a coin-ejecting assembly mounted on said frame, a receptacle that is mounted on said frame and that receives currency and coins from said currency-ejecting assembly and said coin-ejecting assembly and that holds said currency and coins available for patrons, and a currency-identifying unit, the improvement which comprises a pair of members that are mounted on said frame, a base for said currency-identifying unit which has surfaces thereon that can engage said members to guide and confine said currency-identifying unit for movement relative to said members, said members having the outer ends thereof extending to the exterior of said frame to enable said surfaces to be placed in engagement with said members at a point where light and freedom of access are available and having the inner ends thereof extending into a relatively inaccessible area within said change-making device where said currency-identifying unit is normally positioned, whereby said currency-identifying unit can be assembled with said members at a point where light and freedom of access are available and whereby said currency-identifying unit can then be moved along said members while being confined and guided by said members as said currency-identifying unit is moved into said relatively inaccessible area within said change-making device, interacting surfaces on said base adjacent the leading edge of said base and on said frame in said relatively inaccessible area within said change-making device and adjacent said members to precisely hold said leading edge of said base in position within said relatively inaccessible area within said change-making device, and fasteners that are securable to said currency-identifying unit adjacent the other end of said currency-identifying unit, and thus away from said relatively inaccessible area within said change-making device, to releasably hold said currency-identifying unit against movement relative to said members.

4. In a change-making device which has a frame, a currency-ejecting assembly mounted on said frame, a coin-ejecting assembly mounted on said frame, a receptacle that is mounted on said frame and that receives currency and coins from said currency-ejecting assembly and said coin-ejecting assembly and that holds said currency and coins available for patrons, and a currency-identifying unit, the improvement which comprises a pair of members that are mounted on said frame, and a base for said currency-identifying unit which has surfaces thereon that can engage said members to guide and confine said currency-identifying unit for movement relative to said members, said members having the outer ends thereof extending to the exterior of said frame to enable said surfaces to be placed in engagement with said members at a point where light and freedom of access are available and having the inner ends thereof extending into a relatively inaccessible area within said change-making device where said currency-identifying unit is normally positioned, whereby said currency-identifying unit can be assembled with said members at a point where light and freedom of access are available and whereby said currency-identifying unit can then be moved along said members while being confined and guided by said members as said currency-identifying unit is moved into said relatively inaccessible area within said change-making device.

5. In a change-making device which has a frame, an opening in said frame, a currency-ejecting assembly mounted on said frame, a coin-ejecting assembly mounted on said frame, a receptacle that is mounted on said frame and that receives currency and coins from said currency-ejecting assembly and said coin-ejecting assembly and that holds said currency and coins available for patrons, and a currency-identifying unit, the improvement comprising a currency-receiving platform for said currency-identifying unit that normally is in register with and is abutting said opening, members that are mounted on said frame, a housing for said currency-identifying unit which has surfaces thereon that can engage said members to guide and confine said currency-identifying unit for movement relative to said members, said members having the outer ends thereof extending to the exterior of said frame to enable said surfaces to be placed in engagement with said members at a point where light and freedom of access are available and having the inner ends thereof extending into a relatively inaccessible area within said change-making device where said currency-identifying unit is normally positioned and where said platform is in register with and is abutting said opening, whereby said currency-identifying unit can be assembled with said members at a point where light and freedom of access are available and whereby said currency-identifying unit can then be moved along said members while being confined and guided by said members as said currency-identifying unit is moved into said relatively inaccessible area within said change-making device.

6. In a change-making device which has a frame, a change-ejecting assembly mounted on said frame, a receptacle that is mounted on said frame and that receives change from said change-ejecting assembly and that holds said change available for patrons, and a currency-identifying unit, the improvement which comprises interacting surfaces on said frame and on said currency-identifying unit to guide and confine said currency-identifying unit relative to said frame, the surface of said interacting surfaces which is on said frame having the outer end thereof extending to the exterior of said frame to enable said interacting surfaces to be placed in engagement with each other at a point where light and freedom of access are available and having the inner end thereof extending into a relatively inaccessible area within said change-making device where said currency-identifying unit is normally positioned.

7. In a change-making device which pays out currency and coins as change, a currency-ejecting assembly, a coin-ejecting assembly, a currency storage tube, a coin storage tube, a rotatable shaft adjacent said currency-ejecting assembly and adjacent said coin-ejecting assembly, a motor to rotate said shaft, an empty switch adjacent said currency storage tube, a second empty switch adjacent said coin storage tube, and a frame that supports said currency-ejecting assembly and said coin-ejecting assembly and said rotatable shaft and said motor and said empty switches and that is bodily removable from said frame for said change-making device, the first said frame normally being held adjacent the top of said frame for said change-making device.

8. In a change-making device which pays out currency and coins as change, a currency-ejecting assembly, a coin-ejecting assembly, a currency storage tube, a coin storage tube, a support, said currency storage tube having the lower end thereof releasably securable to said support and having the upper end thereof releasably securable to said currency-ejecting assembly, said coin storage tube having the lower end thereof releasably securable to said support and having the upper end thereof releasably securable to said coin-ejecting assembly, a rotatable shaft adjacent said currency-ejecting assembly and adjacent said coin-ejecting assembly, a motor to rotate said shaft, an empty switch adjacent said currency storage tube, a second empty switch adjacent said coin storage tube, a chute that is adapted to receive currency and coins from said currency-ejecting assembly and said coin-ejecting assembly, and a second frame that supports said currency-ejecting assembly and said coin-ejecting assembly and said rotatable shaft and said motor and said empty switches and that normally holds said currency-ejecting assembly and said coin-ejecting assembly immediately adjacent said chute but that is bodily removable from said frame for said change-making device, said second frame normally being held adjacent the top of said frame for said change-making device.

9. In a change-making device which pays out coins as change, a coin-ejecting assembly, a coin storage tube, a support, said coin storage tube having the lower end thereof releasably securable to said support and having the upper end thereof releasably securable to said coin-ejecting assembly, a rotatable shaft adjacent said coin ejecting assembly, a motor to rotate said shaft, an empty switch adjacent said coin storage tube, and a frame that supports said coin-ejecting assembly and said rotatable shaft and said motor and said empty switch that is bodily removable from said frame for said change-making device.

10. In a change-making device which pays out currency as change, a currency-ejecting assembly, a currency storage tube, a support, said currency storage tube having the lower end thereof releasably securable to said support and having the upper end thereof releasably securable to said currency-ejecting assembly, a rotatable shaft adjacent said currency-ejecting assembly, a motor to rotate said shaft, an empty switch adjacent said currency storage tube, and a frame that supports said currency-ejecting assembly and said rotatable shaft and said motor and said empty switch and that is bodily removable from said frame for said change-making device.

References Cited in the file of this patent

UNITED STATES PATENTS

| | | |
|---|---|---|
| 743,182 | Meyer | Nov. 3, 1903 |
| 1,272,224 | Combs | July 9, 1918 |
| 1,385,822 | Grover | July 26, 1921 |
| 1,578,640 | Bunn | Mar. 30, 1926 |
| 1,953,507 | Schnaier | Apr. 3, 1934 |
| 2,129,322 | Hakanson | Sept. 6, 1938 |
| 2,498,150 | Brahe | Feb. 21, 1950 |
| 2,581,502 | Wallin | Jan. 8, 1952 |
| 2,802,474 | DuGrenier | Aug. 13, 1957 |
| 2,805,675 | Noyes | Sept. 10, 1957 |
| 2,825,488 | Nelson | Mar. 4, 1958 |
| 2,827,822 | Timms | Mar. 25, 1958 |
| 2,884,110 | Krasney | Apr. 28, 1959 |
| 2,894,612 | Care | July 14, 1959 |
| 2,896,763 | Gisser | July 28, 1959 |
| 2,910,991 | Quinn | Nov. 3, 1959 |
| 2,932,392 | Burtner | Apr. 12, 1960 |
| 2,957,387 | Patzer | Oct. 25, 1960 |
| 2,995,976 | Weingart | Aug. 15, 1961 |